United States Patent
Taru et al.

(10) Patent No.: US 6,543,256 B1
(45) Date of Patent: Apr. 8, 2003

(54) OPTICAL FIBER COUPLER MAKING APPARATUS MADE FROM ZIRCONIA AND METHOD

(75) Inventors: Toshiki Taru, Yokohama (JP); Ichiro Tsuchiya, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 152 days.

(21) Appl. No.: 09/590,166

(22) Filed: Jun. 9, 2000

(30) Foreign Application Priority Data

Jun. 10, 1999 (JP) .......................... P11-163968
May 23, 2000 (JP) ..................... P2000-151746

(51) Int. Cl.[7] .......................................... C03B 37/029
(52) U.S. Cl. ........................ 65/407; 65/408; 65/410; 65/411; 65/501; 65/373.13
(58) Field of Search ................. 65/407, 408, 410, 65/411, 483, 501, 374.13

(56) References Cited

U.S. PATENT DOCUMENTS

| | | | | |
|---|---|---|---|---|
| 4,152,572 A | * | 5/1979 | Noda et al. | 219/118 |
| 5,073,689 A | * | 12/1991 | Tabata et al. | 219/200 |
| 5,384,878 A | * | 1/1995 | Osaka et al. | 385/95 |
| 5,417,399 A | * | 5/1995 | Saito et al. | 248/317 |

FOREIGN PATENT DOCUMENTS

| | | |
|---|---|---|
| JP | 3-160404 | 7/1991 |
| JP | 11-16671 | 1/1999 |

* cited by examiner

*Primary Examiner*—John Hoffman
(74) *Attorney, Agent, or Firm*—McDermott, Will & Emery

(57) ABSTRACT

In an optical fiber coupler making apparatus which makes an optical fiber coupler by thermally fusing a plurality of optical fibers together by use of a heater and then elongating thus thermally fused part, the heater comprises a heating element which is made of zirconia and which has a slit for containing the optical fibers. The inner face of the heating element is preferentially heated due to a characteristic of its material. Consequently, if optical fibers are contained in the fiber receiving slit, then they can be thermally fused at a sufficiently high temperature in a short period of time, whereby reducing mingling of impurities into the optical fiber coupler. Therefore, the heating element made of zirconia is effective as means for preventing impurities from mingling from the outside thereof. Also, performances of the heating element can be maintained over a long period of time even if the optical fibers are thermally fused at a high temperature. Further, the evaporation of impurities, which may adversely affect characteristics of the optical fiber coupler, hardly occurs from the heating element.

11 Claims, 8 Drawing Sheets

OPTICAL FIBER COUPLER MAKING APPARATUS MADE FROM ZIRCONIA AND METHOD

BACKGROUND OF THE INVENTION

1. Field of the Invention

The present invention relates to an apparatus and method for making an optical fiber coupler used in advanced information network systems, optical communications systems such as optical LAN, and the like, for example.

2. Related Background Art

An optical fiber coupler is used for causing light entering from one optical fiber to branch out into a plurality of optical fibers, or causing a plurality of light components entering from their respective optical fibers to combine together into one optical fiber. The optical fiber coupler is made by an optical fiber coupler making apparatus. The optical fiber coupler making apparatus thermally fuses a plurality of optical fibers together by use of a heater, and elongates thus thermally fused part, thereby making the optical fiber coupler. As the heater, platinum heaters, lanthanum chromite heaters, and the like have conventionally been in use (e.g., Japanese Patent Application Laid-Open Nos. HEI 3-160404 and HEI 11-16671).

SUMMARY OF THE INVENTION

Having studied the conventional optical fiber coupler making apparatus, the inventors have found the follwing problems. Namely, the conventional optical fiber coupler making apparatus using a platinum heater is unpractical in that the maximum temperature of the platinum heater is so low that it takes time to thermally fuse optical fibers. On the other hand, though the optical fiber coupler making apparatus using a lanthanum chromite heater has been in practical use with its achievable maximum temperature (e.g., 1550° C.) being higher than that in the platinum heater, it has not yet been considered sufficient from the viewpoint of further improving the productivity of optical fiber couplers.

Here, if temperature is further raised in the platinum heater and lanthanum chromite heater in order to improve the productivity, then their temperature distribution characteristics and life will deteriorate. As a consequence, operations such as replacement of heaters become necessary, which not only makes operations troublesome but also requires higher running cost.

Also, in the above-mentioned conventional optical fiber coupler making apparatus, impurities may evaporate during the operation of the platinum heater or lanthanum chromite heater. If the impurities mingle into melted optical fibers, then the resulting optical fiber coupler may lower its mechanical strength and increase its transmission loss. Hence, in order to prevent the impurities from mingling into the optical fibers, it is necessary for a core tube to intervene between the heater and the optical fibers. This configuration is not favorable in particular in heaters whose maximum temperature is not considered to be sufficient, since it deteriorates the efficiency of heat transfer to the optical fibers. Also, the intervention of the core tube complicates the structure of the optical fiber coupler making apparatus, thereby increasing the cost of equipment.

In view of the circumstances mentioned above, it is an object of the present invention to provide an optical fiber coupler making apparatus and method which can improve the productivity of optical fiber couplers and can cut down the cost of equipment.

For achieving the above-mentioned object, the present invention provides an optical fiber coupler making apparatus which makes an optical fiber coupler by thermally fusing a plurality of optical fibers together by use of a heater and then elongating thus thermally fused part, wherein the heater comprises a heating element which is made of zirconia and which has a fiber receiving slit for containing the optical fibers.

In accordance with the present invention, the inner face of the heating element made of zirconia is preferentially heated due to a characteristic of its material. As a consequence, if optical fibers are contained in the fiber receiving slit, then they can be thermally fused at a sufficiently high temperature in a short period of time, thereby reducing mingling of impurities into the optical fiber coupler. Therefore, the heating element made of zirconia is effective as means for preventing impurities from mingling from the outside thereof. Also, performances of the heating element can be maintained over a long period of time even if the optical fibers are thermally fused at a high temperature. Further, the evaporation of impurities, which may adversely affect characteristics of the optical fiber coupler, hardly occurs from the zirconia-made heating element itself. As a consequence, it is unnecessary that a core tube or the like intervenes between the heating element and the optical fibers in order to prevent such impurities from mingling into the optical fibers, whereby the heating element itself can be made smaller with a simpler structure.

The present invention also provides an optical fiber coupler making method which makes an optical fiber coupler by thermally fusing a plurality of optical fibers together by use of a heater and then elongating thus thermally fused part, wherein the heater comprises a heating element which is made of zirconia and which has a fiber receiving slit for containing the optical fibers; the method comprising the steps of causing the fiber receiving slit to contain the optical fibers therein and thermally fusing the optical fibers together by controlling the heating element to attain a temperature of 1700° C. or higher.

In accordance with the present invention, the inner face of the heating element made of zirconia is preferentially heated due to a characteristic of its material. As a consequence, if optical fibers are contained in the fiber receiving slit of the heating element and heated at a temperature of 1700° C. or higher, then the time required for the step of thermally fusing the optical fibers is sufficiently shortened, thereby reducing mingling of impurities into the optical fiber coupler. Therefore, the heating element made of zirconia is effective as means for preventing impurities from mingling from the outside thereof. Also, performances of the heating element can be maintained over a long period of time even if the optical fibers are thermally fused at a high temperature. Further, the evaporation of impurities, which may adversely affect characteristics of the optical fiber coupler, hardly occurs from the zirconia-made heating element itself. As a consequence, it is unnecessary that the optical fibers are heated by way of a core tube or the like and thermally fused in order to prevent such impurities from mingling into the optical fibers, whereby the heating element itself can be made smaller with a simpler structure. Also, if a fu sing and elongating process is carried out at a sufficiently high temperature which ha s not been attainable by conventional heaters, even a small-sized heater can smoothen the taper form of an optical fiber coupler, thus being able to make an optical fiber coupler having a low transmission loss.

DETAILED DESCRIPTION OF THE PREFERRED EMBODIMENTS

In the following, embodiments of the optical fiber coupler making apparatus in accordance with the present invention will be explained with reference to the accompanying drawings.

Figure 1:
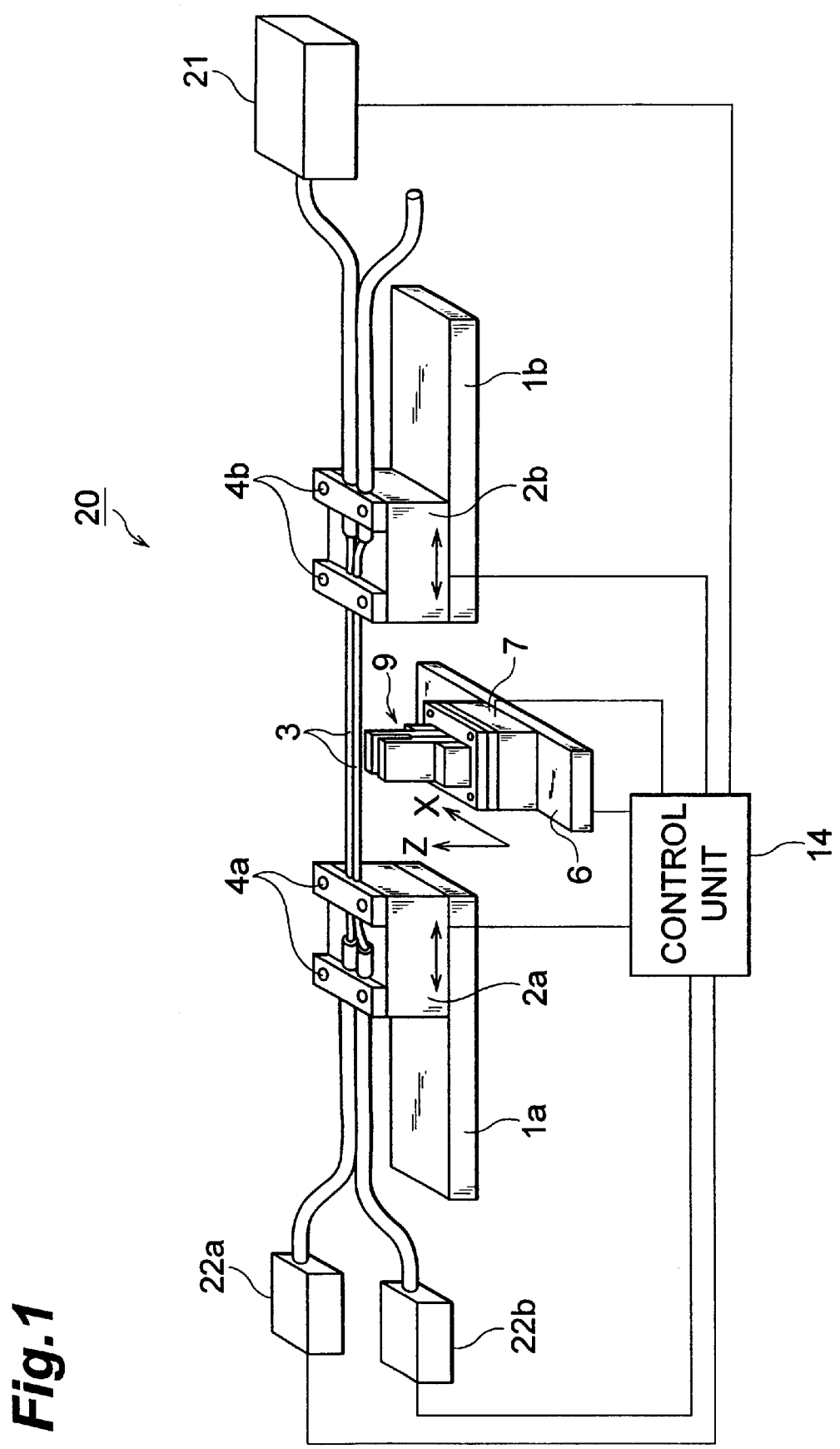
FIG. 1 is a perspective view showing a first embodiment of the optical fiber coupler making apparatus in accordance with the present invention.

FIG. 1 is a perspective view showing a first embodiment of the optical fiber coupler making apparatus. As shown in FIG. 1, the optical fiber coupler making apparatus 20 comprises a pair of planar stages 1a, 1b opposing each other. Elongating stages 2a, 2b, each shaped like a rectangular parallelepiped, are attached onto the stages 1a, 1b, respectively, so as to be movable relative thereto. Also, in the optical fiber coupler making apparatus 20, a plurality of optical fibers 3 would be put on the elongating stages 2a, 2b. Hence, in order to secure the plurality of optical fibers 3 in contact with each other to the elongating stages 2a, 2b, the elongating stages 2a, 2b are provided with clamps 4a, 4b for holding the optical fibers 3 with the elongating stages 2a, 2b, respectively. If the optical fibers 3 have a coating outside their cladding, then they will be used after the coating is partly eliminated therefrom.

Between the stages 1a, 1b, X-stage 6 is disposed to be able to reciprocate in a direction (along the X-axis in FIG. 1) substantially orthogonal to an axis along which the elongating stages 2a, 2b align. Attached onto the X-stage 6 is a Z-stage 7 which can ascend and descend in directions orthogonal to the X-axis. The X-stage 6, Z-stage 7, and elongating stages 2a, 2b are controlled by a control unit 14. Here, the X-stage 6 and Z-stage 7 constitute moving means of a heater 9. Disposed on the Z-stage 7 is the heater 9 which comprises a heating element 12 as shown in FIG. 2.

Figure 2:
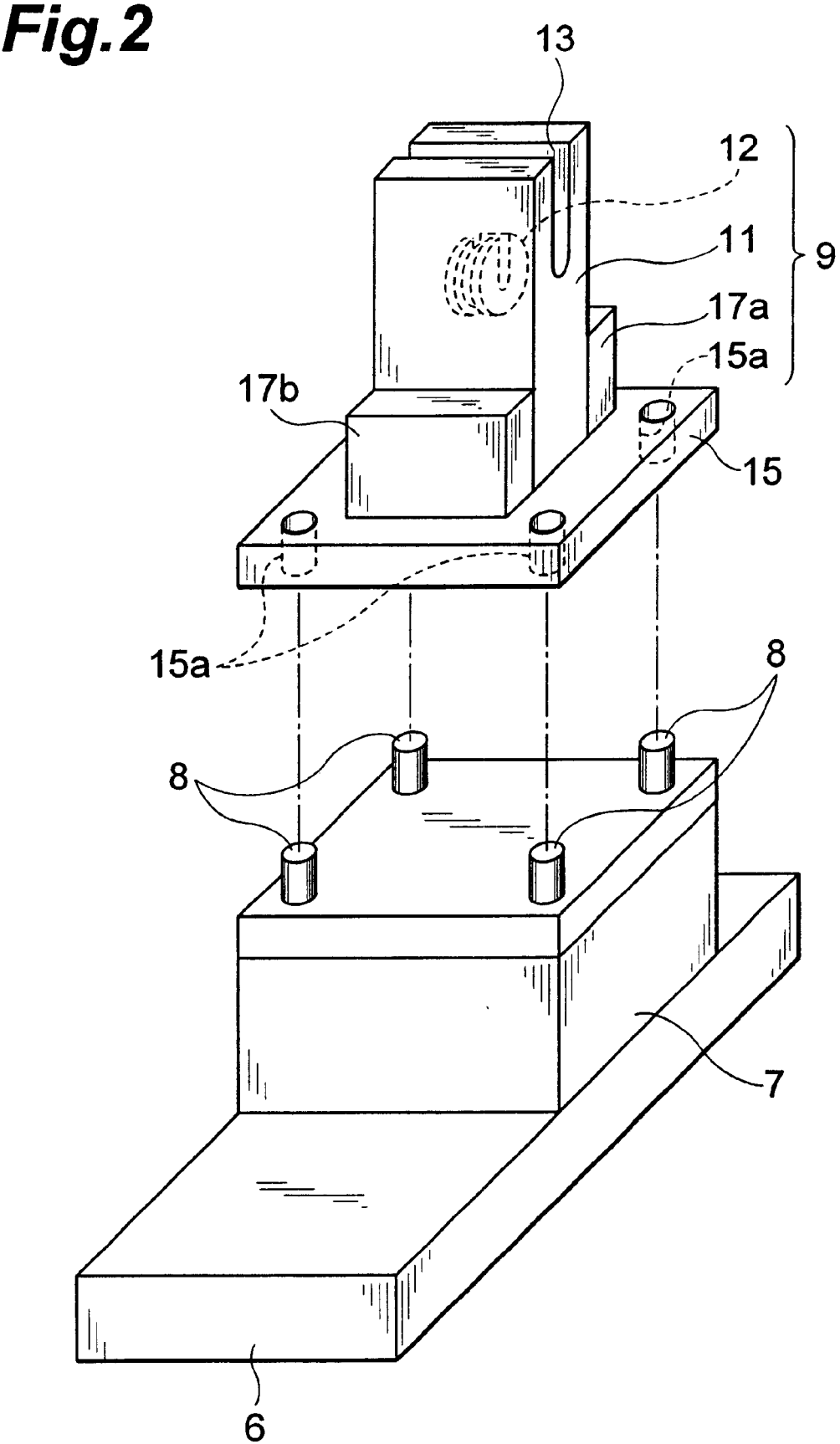
FIG. 2 is an exploded perspective view showing the configuration of heater, X-stage, and Z-stage in FIG. 1.
Figure 3:
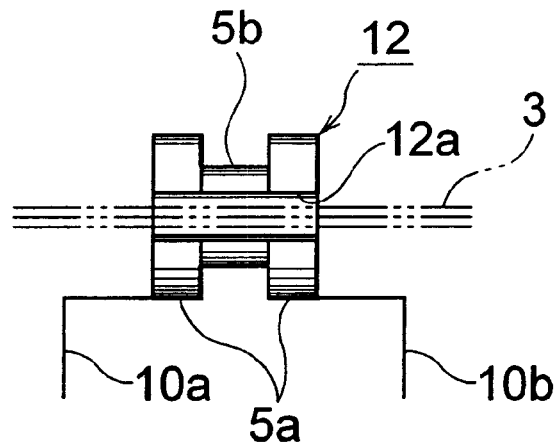
FIG. 3 is a plan view showing the heating element of FIG. 2.

FIG. 3 is a plan view showing the heating element 12 of FIG. 2. As shown in FIG. 3, platinum leads 10a, 10b, for example, are connected to the heating element 12, whereby the heating element 12 heats when energized by way of the platinum leads 10a, 10b.

The heating element 12 is made of zirconia. The heating element 12 made of zirconia is employed because of the fact that it is effective as means for preventing impurities from mingling from the outside thereof since it can thermally fuse the optical fibers 3 at a temperature of 1700° C. or higher in a short period of time, thereby reducing mingling of impurities into the optical fiber coupler, while keeping a life sufficiently longer than that of platinum heaters or lanthanum chromite heaters, and because of the fact that the evaporation of impurities, which may adversely affect characteristics of the optical fiber coupler, hardly occurs from the zirconia-made heating element 12 itself. Also, the inner face of the heating element 12 made of zirconia preferentially heats due to a characteristic of its material. Therefore, from the viewpoint of heating the optical fibers 3 at a sufficiently high temperature in a short period of time, a fiber receiving slit 12a is formed in heating element 12, so that the optical fibers 3 are contained within the fiber receiving slit 12a. In FIG. 3, the heating element 12 is constituted, for example, by a pair of disk parts 5a and a columnar part 5b disposed therebetween, whereas the fiber receiving slit 12a is formed so as to extend throughout the disk parts 5a and columnar part 5b.

Figure 4:
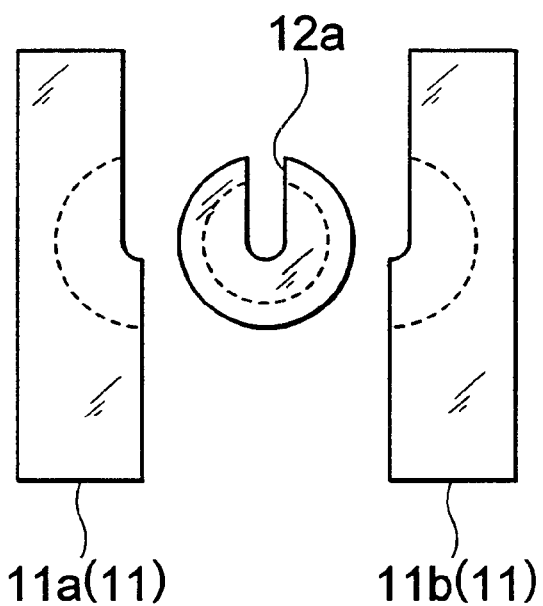
FIG. 4 is an exploded front view showing the heating element of FIG. 2 and a heat insulating member for accommodating the heating element.

Preferably, as shown in FIG. 4, the heating element 12 is contained within a heat insulating member 11. As a consequence, the heat emitted from the zirconia-made heating element 12 becomes harder to escape therefrom into its surroundings, whereby the optical fibers 3 can be thermally fused more efficiently. The material constituting the heat insulating member 11 is not limited in particular as long as it has a heat insulating property. For example, the heat insulating member 11 is made of porous magnesia or the like. Also, a guide groove 13 for guiding the optical fibers 3 into the fiber receiving slit 12a is formed in heat insulating member 11 such that optical fibers can be contained in the fiber receiving slit 12a. Here, the heat insulating member 11 is preferably adapted to split into two heat insulating members 11a, 11b, for example, from the viewpoint of making it easier for the zirconia-made heating element 12 to be contained therein and taken out therefrom.

Preferably, the heater 9 comprises an anchor member 15 having a pair of clamps 17a, 17b for holding the heat insulating member 11, whereas the anchor member 15 and the Z-stage 7 are adapted to engage each other. For example, as shown in FIG. 2, a plurality of through holes 15a are formed in anchor member 15, whereas the Z-stage 7 is provided with a plurality of vertically extending positioning pins 8 adapted to fit into their corresponding through holes 15a. This configuration is employed because of the fact that, while the optical fibers 3 are needed to be disposed at a predetermined position within the fiber receiving slit 12a in the heating element 12 from the viewpoint of temperature distribution in the fiber receiving slit 12a and the like, it causes the optical fibers 3 to be reliably secured at the predetermined position within the fiber receiving slit 12a during the time when the optical fibers 3 are being thermally fused together.

An optical fiber coupler making method utilizing the optical fiber coupler making apparatus 20 having the above-mentioned configuration will now be explained.

First, a plurality of (e.g., two) optical fibers 3 are prepared. The plurality of optical fibers 3 are secured to the elongating stages 2a, 2b in a state where parts to be fused together are in contact with each other and are tensed by the clamps 4a, 4b. If the optical fibers 3 have a coating outside their cladding, then the parts to be fused are stripped of the coating, and thus stripped parts are fixed to the elongating stages 2a, 2b. Here, as shown in FIG. 1, a light source (e.g., an LD light source having a wavelength of 1.55 $\mu$m) 21 may be connected to one end of one of the plurality of optical fibers 3, whereas photodetectors 22a, 22b are connected to the plurality of optical fibers 3 at the other end, and the control unit 14 may control the lighting of the light source 21 and operations of the photodetectors 22a, 22b, so as to continuously monitor the transmission loss of the optical fibers 3 at the time of thermal fusion and elongation.

Subsequently, the heater 9 in which the heating element 12 is controlled to attain a temperature of 1000° C. or higher (e.g., 1100° C.), for example, is secured to the Z-stage 7. Though the zirconia-made heating element 12 has properties of an insulator up to about 1000° C., it yields an electric conductivity when heated to 1000° C. or higher.

Figure 5:
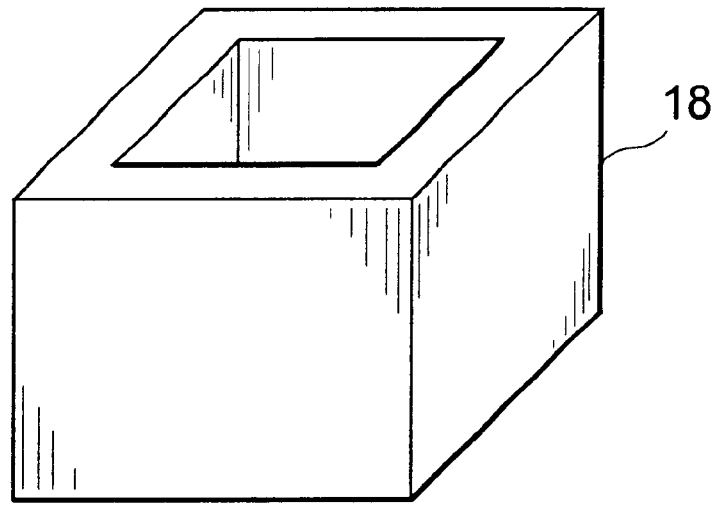
FIG. 5 is a perspective view showing a preheating furnace used for preheating the heating element.
Figure 6:
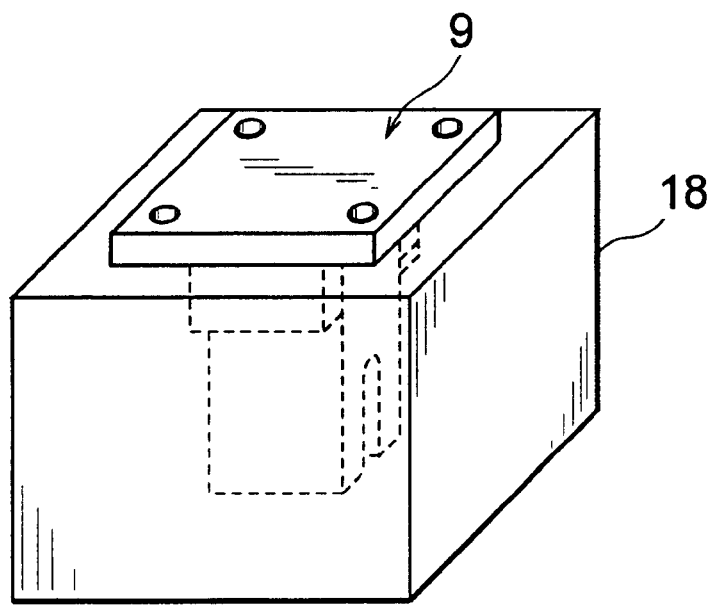
FIG. 6 is a perspective view showing a state where the heater of FIG. 2 is inserted in the preheating furnace.

Here, for controlling the heating element 12 to have a temperature of 1000° C. or higher, it is preferred that a box-shaped preheating furnace 18 (see FIG. 5) be prepared beforehand, the heater 9 be inserted into the preheating furnace 18 (see FIG. 6), and the heating element 12 be controlled to attain a temperature of 1000° C. or higher. In this case, since the heating element 12 has an electric conductivity, when the heating element 12 is energized, it can reach a high temperature state in a very short period of time, thus being able to quickly shift to a thermal fusion step which will be explained later. Here, for causing the heating element 12 to attain a temperature of 1000° C. or higher, the temperature of the preheating furnace 18 is raised at a rate of about 15° C./minute for about 1.5 hr.

Figure 7A:
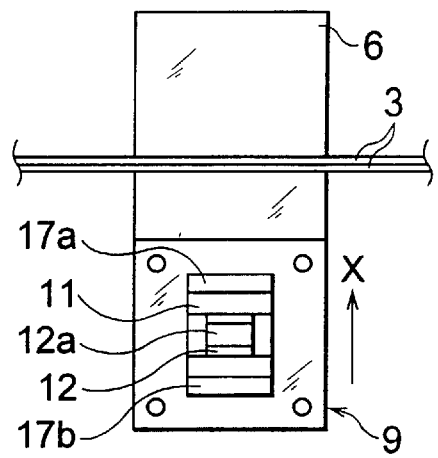
FIGS. 7A to 7D are a series of drawings showing respective steps of an embodiment of the optical fiber coupler making method using the optical fiber coupler making apparatus of FIG. 1.

The heater 9 is thus set to the Z-stage 7, then the control unit 14 actuates the X-stage 6, so as to move the heater 9 toward the optical fibers 3. Here, current is kept passing through the heating element 12 in order to maintain a temperature of heating element 12 at 1000° C. or higher. Then, the heater 9 is disposed under the optical fibers 3 such that the guide groove 13 of the heat insulating member 11 is located directly below the optical fibers 3 (see FIG. 7A).

Figure 7B:
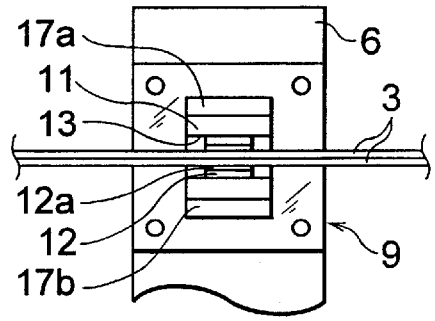

Thereafter, as shown in FIG. 7B, the control unit 14 moves up the Z-stage 7, so as to raise the heater 9, thereby accommodating the optical fibers 3 into the fiber receiving slit 12a of the heating element 12 by way of the guide groove 13 of the heat insulating member 11. Then, the current passing through the platinum leads is increased so that the temperature is raised to 1700° C. or higher, whereby the optical fibers 3 are thermally fused. The temperature of the heating element 12 is raised to 1700° C. or higher because of the fact that it takes a considerable time to thermally fuse the optical fibers 3 together if the temperature is lower than 1700° C. On the other hand, the temperature of the heating element 12 is preferably 2200° C. or lower since there is a tendency of the platinum leads 10a, 10b to deteriorate severely and the heating element 12 to shorten its life if the temperature exceeds 2200° C.

If the temperature of the heating element 12 is to be controlled while being monitored by a thermocouple, a radiation thermometer, or the like in the case where the heating element 12 is small (e.g., when it has a diameter of about 15 mm and a length of about 15 mm), then the temperature tends to fluctuate. Therefore, it is preferred that the current value be monitored in order to control the temperature of the heating element 12. In this case, it is necessary that a relationship between the actual temperature and the current value be determined beforehand.

In the above-mentioned thermal fusion of the optical fibers 3, since the temperature of the heating element 12 is 1700° C. or higher, the thermal fusion of the optical fibers 3 completes in a very short period of time. Therefore, the productivity of optical fiber couplers greatly improves. Also, even if the heating element 12 is used at a high temperature as described above, its performances are maintained over a long period of time, whereby not only operations for replacing the heating element 12 becomes unnecessary for a long period of time, but also its running cost is cut down, which is quite practical. Further, the evaporation of impurities, which may adversely affect characteristics of the optical fiber coupler 19, hardly occurs from the zirconia-made heating element 12. As a consequence, it is unnecessary that a core tube or the like intervenes between the heating element 12 and the optical fibers 3 in order to prevent such impurities from mingling into the optical fibers 3. Therefore, the heating element 12 itself can be made smaller with a simpler structure, whereby the making apparatus 20 can reduce its dimensions and cost of equipment. Also, if a fusing and elongating process is carried out at a sufficiently high temperature which has not been attainable by conventional heaters, even a small-sized heater can smoothen the taper form of optical fiber couplers, thus being able to make optical fiber couplers having a low transmission loss.

Figure 7C:
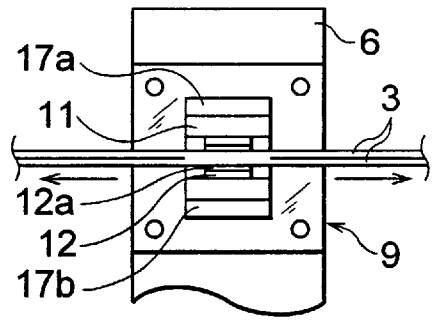

Once the optical fibers 3 are thermally fused together as described above, then the control unit 14 actuates the elongating stages 2a, 2b, such that the elongating stages 2a, 2b move away from each other as shown in FIG. 7C by two arrows. Here, the temperature of the heating element 12 is lowered, for example, to 1600° C. and then is lowered to about 1500 to 1300° C. stepwise or continuously. Thus, the thermally fused optical fibers 3 are elongated, whereby the optical fiber coupler 19 is obtained.

Figure 7D:
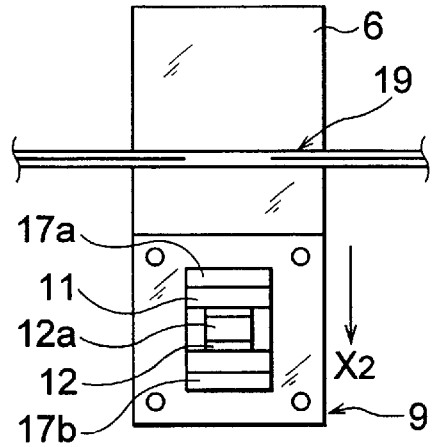
Figure 8:
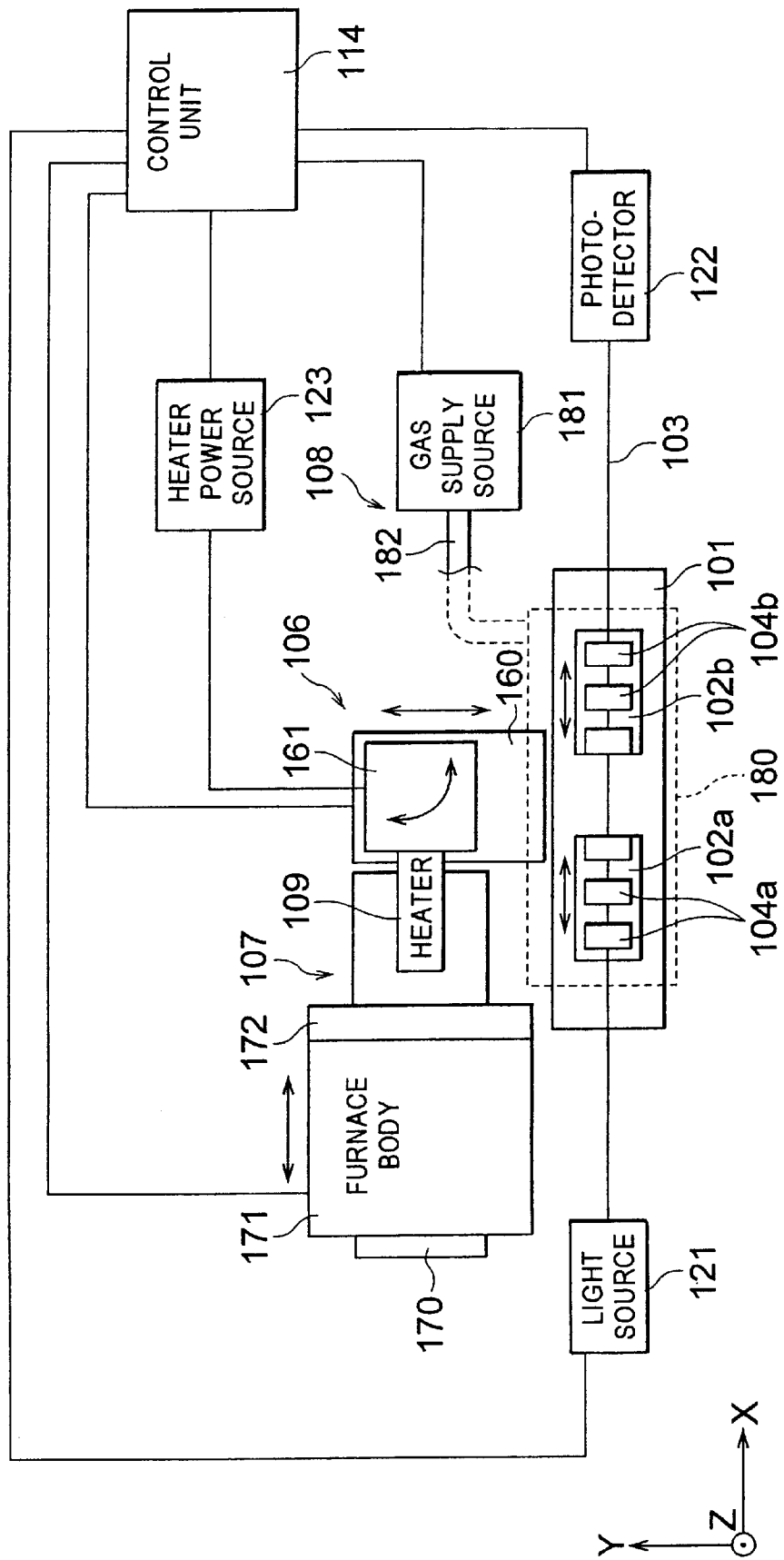
FIG. 8 is a plan view showing a second embodiment of the optical fiber coupler making apparatus in accordance with the present invention.

Once the optical fiber coupler 19 is made, the control unit 14 lowers the Z-stage 7 and then moves the X-stage 6 in the direction of X2 as shown in FIG. 7D, so as to retract the heater 9 from the optical fiber coupler 19. Thereafter, the optical fiber coupler 19 is accommodated in a case (reinforcing member) and the optical fiber coupler 19 is removed from the elongating stages 2a, 2b, whereby completing the manufacture of the optical fiber coupler 19.

In the case where optical fiber couplers are continuously made in the above-mentioned embodiment, the heating element 12 in the heater 9 is controlled so as to attain a fusion temperature before making the next optical fiber coupler. As a consequence, the optical fibers 3 can be thermally fused together rapidly when they are set to the elongating stages 2a, 2b, whereby fluctuations in the fusion can be reduced, and the productivity of the optical fiber coupler 19 can be improved greatly. Here, the temperature of the heater 9 at the time of fusion is preferably 1700 to 2200° C.

A second embodiment of the optical fiber coupler making apparatus in accordance with the present invention will now be explained.

FIGS. 8 to 10B show the second embodiment of the optical fiber coupler making apparatus in accordance with the present invention.

In the same way as described in the above-mentioned first embodiment, a pair of elongating stages 102a, 102b for elongating optical fibers 103 are movably attached onto a stage 101. A plurality of clamps 104a, 104b (which may not be plural) are attachable onto each of the elongating stages 102a, 102b. The clamps 104a, 104b are used for securing the optical fiber 103 onto the elongating stages 102a, 102b. Disposed on extensions of both ends of the stage 101, as in the first embodiment, are a light source 121 and a photodetector 122, to which both ends of the optical fibers 103 are attached at the time of making the optical fiber coupler, respectively, for monitoring transmission loss.

Disposed beside the stage 101 is a moving mechanism (moving means) 106 for moving a heater 109. The moving mechanism 106 comprises a stage 160 and a movable part 161 attached to the stage 160 so as to be slidable along the Y-axis (see the lower left in FIG. 8) on the stage 160. The heater 109 is attached to the movable part 161. This moving mechanism 106 will be explained later in detail.

In the vicinity of the moving mechanism 106, a preheating furnace 107 is disposed. The preheating furnace 107 is constituted by a stage 170 and a furnace body 171 which is attached onto the stage 170 so as to be slidable along the X-axis. Here, the furnace body 171 has a lid 172 for blocking an opening for inserting and removing the heater 109. The lid 172 is removable.

Further disposed is a gas supply mechanism 108 for supplying a gas into the surroundings of the heater 109 at the time of making an optical fiber coupler. The gas supply mechanism 108 is constituted by a box 180 for enclosing the surroundings of the heater 109, i.e., the vicinity of the elongating stages 102a, 102b, at the time of making the optical fiber coupler; a gas supply source 181 for feeding a clean gas (gas containing no moisture) such as dry air, dry nitrogen, or the like, for example, into the box 180; and a pipe 182 for connecting the box 180 and the gas supply source 181 to each other.

The above-mentioned moving mechanism 106, preheating furnace 107, gas supply source 181 of the gas supply mechanism 108, and heater 109 are connected to a control unit 114. The driving of the moving mechanism 106, the operating and moving of the preheating furnace 107, the driving of the gas supply source 181, and the like are controlled by the control unit 114 (though the gas supply may manually be started/stopped without providing the gas supply source 181). Also, the heater 109 is connected to the control unit 114 by way of a heater power source 123, whereas the control unit 114 controls the power supplied to the heater 109 by way of the heater power source 123.

Figure 9:
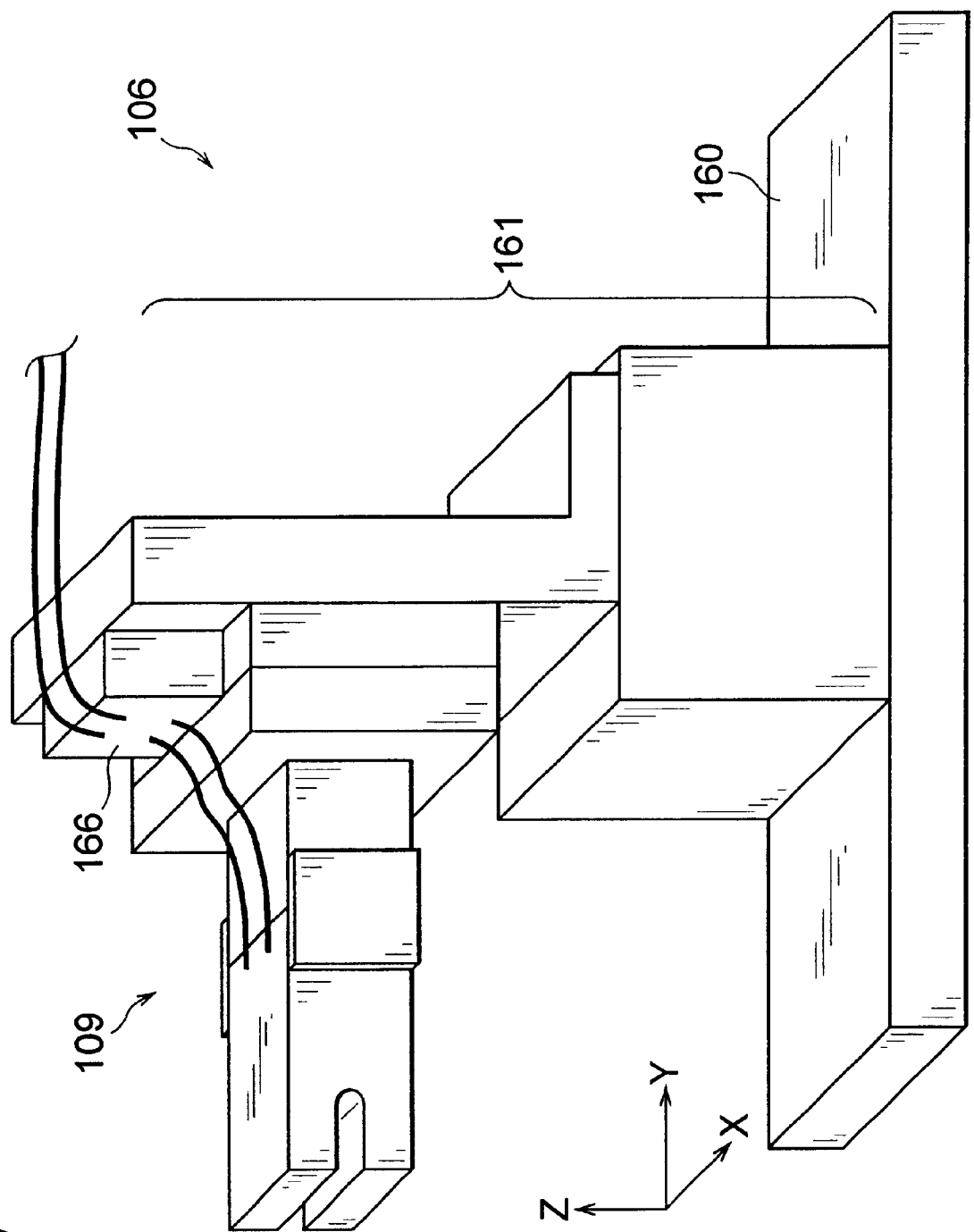
FIG. 9 is a perspective view showing the heater and its surroundings in FIG. 8.

The moving mechanism 106 will now be explained in detail. As mentioned above, the movable mechanism 106 is constituted by the stage 160 and the movable part 161 on the stage 160. As shown in FIG. 9, the movable part 161 moves the heater 109 in a swinging fashion on the stage 160, so as to adjust the position thereof. The heater 109 is detachable. A terminal mount 166 is also attached to the movable part 161, whereas power supply lines from the heater power source 123 are connected to the terminal mount 166. Also, power lines from the heater 109 are connected to the terminal mount 166.

As mentioned above, the heater 109 is detachable. When detaching the heater 109, its connecting lines are removed from the terminal mount 166. After the heater 109 is attached to the movable part 161, its power lines are connected to the terminal mount 166, whereby they are connected to the heater power source 123. The heater 109 in the second embodiment will not be explained in detail since it has the similar structure to that in the first embodiment. However, heater 109 in the second embodiment is disposed with its slit being horizontally and opening on the side face, whereas that in the first embodiment is disposed with its slit opening on the top face. In the following explanation, parts equivalent to each other will be referred to with numerals identical to each other.

A procedure of making an optical fiber coupler by use of the above-mentioned making apparatus will be explained with reference to FIGS. 10A and 10B.

First, before making the optical fiber coupler, the temperature of the heating element 12 of the heater 109 is raised to 1000° C. or higher by use of the preheating furnace 107.

Since the zirconia-made heating element 12 has such a property as to become substantially an insulator up to about 1000° C. as mentioned above, it is preheated by use of the preheating furnace 107. Thus, the lid 172 is opened, and the heater 109 is inserted into the furnace body 171 of the preheating furnace 107.

Figure 10A:
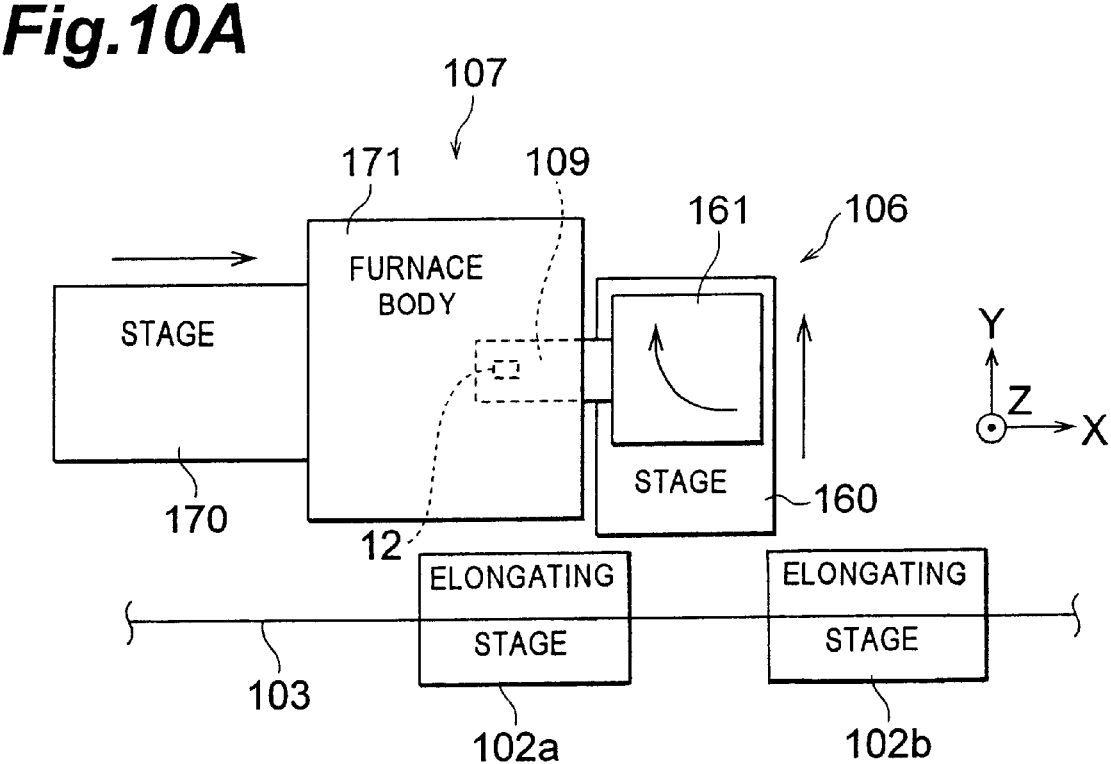
FIGS. 10A and 10B are plan views showing operations of the heater in the apparatus shown in FIG. 8 at the time of preheating and at the time of heating optical fibers, respectively.
Figure 10B:
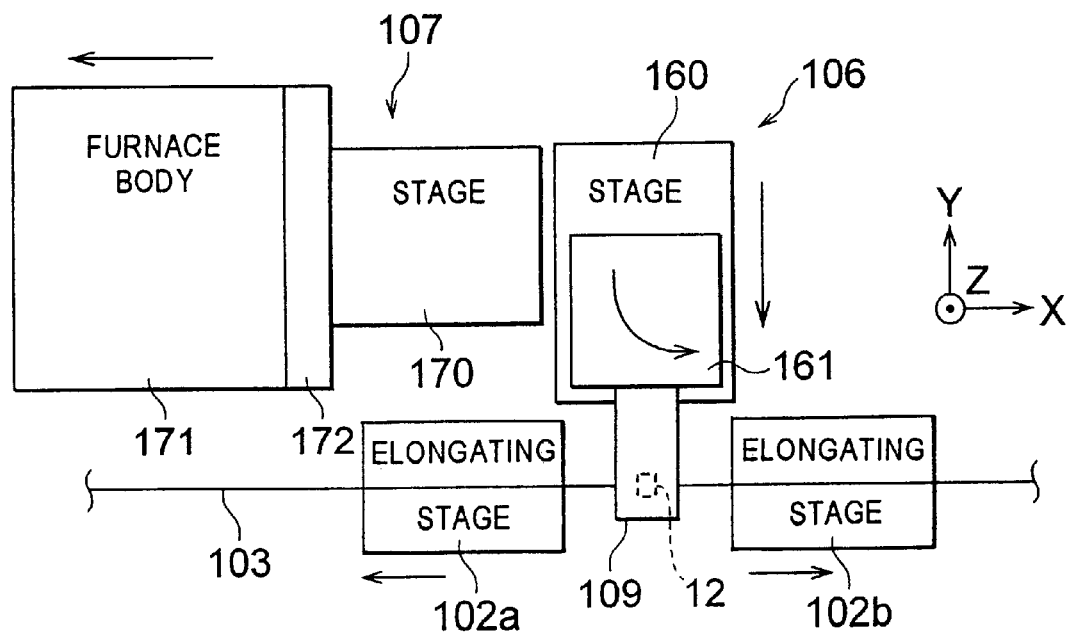

For inserting the heater 109 into the furnace body 171, the movable part 161 is driven to rotate, such that the heater 109 faces the preheating furnace 107, and also is moved in the direction of arrow along the Y-axis shown in FIG. 10A. In the preheating furnace 107, on the other hand, the furnace body 171 is moved on the stage 170 toward the moving mechanism 106, so that the heater 109 is inserted into the furnace body 171. The furnace body 171 is slowly energized, for example at a rate of 15° C./minute, whereby the heater 109 gradually raises its temperature.

Once the heater 109, i.e., the heating element 12, has attained a predetermined temperature, then the optical fibers 103 secured with the elongating stages 102a, 102b are inserted into the guide groove 13 of the heater 109. Here, the furnace body 171 is retracted from the moving mechanism 106, and the movable part 161 is driven to rotate, whereby the heater 109 is moved toward the optical fibers 103. Further, the movable part 161 is moved on the stage 160 in the direction of arrow along the Y-axis shown in FIG. 10B, whereby the heater 109 is moved toward the optical fibers 103 along the Y-axis. The opening of furnace body 171 is closed with the lid 172.

For further improving the reliability of the optical fiber coupler against mechanical strength, while a predetermined part of the optical fibers 103 is contained within the guide groove 13 of the heater 109, i.e., the fiber receiving slit of the heating element 12, its surroundings are blocked from the outside air by use of the box 180, whereas the box 180 is filled with a clean gas by means of the gas supply source 181. Thereafter, the optical fibers 103 are thermally fused together by the heating of the heating element 12. Subsequently, the elongating stages 102a, 102b are moved away from each other, whereby the thermally fused part of the optical fibers 103 is elongated. Here, as described in the above-mentioned first embodiment, the light source 121 and the photodetector 122 are used for monitoring transmission loss. A series of operations for controlling the heating value of the heating element 12, controlling the driving of the moving mechanism 106, and the like are regulated by the control unit 114. Thus, the making of the optical fiber coupler is completed.

As explained in the foregoing, the optical fiber coupler making apparatus and method in accordance with the present invention can heat a plurality of optical fibers to a sufficiently high temperature with a heating element made of zirconia when thermally fusing them together and elongating them, so as to shorten the time required for the thermal fusion, thereby improving the productivity. Also, since impurities are sufficiently kept from evaporating from the heating element made of zirconia, it becomes unnecessary for a core tube or the like to intervene between the heating element and the optical fibers, so that the heating element itself can be made smaller with a simpler structure, whereby the making apparatus can reduce its dimensions and cost of equipment. Also, if a fusing and elongating process is carried out at a sufficiently high temperature which has not been attainable by conventional heaters, even a small-sized heater can smoothen the taper form of an optical fiber coupler, thus being able to make an optical fiber coupler having a low transmission loss.

What is claimed is:

1. The optical fiber coupler making method which makes an optical fiber coupler by thermally fusing a plurality of optical fibers together by use of a heater and then elongating thus thermally fused part, wherein said heater comprises a heating element which is made of zirconia and which has a fiber receiving slit for containing said optical fibers; said method comprising the steps of causing said fiber receiving slit to contain said optical fibers therein and thermally fusing said optical fibers together by controlling said heating element to attain a temperature of 1700° C. or higher.

2. The optical fiber coupler making method according to claim 1, wherein said heating element is retracted from said optical fiber coupler after making said optical fiber coupler and said heating element is controlled to attain a fusion temperature before making the next optical fiber coupler.

3. The optical fiber coupler making method according to claim 1, wherein surroundings of said heater are filled with a clean gas while said plurality of optical fibers are thermally fused by said heater and thus thermally fused part is elongated.

4. An optical fiber coupler making apparatus which makes an optical fiber coupler by thermally fusing a plurality of optical fibers together by use of a heater and then elongating thus thermally fused part, wherein said heater comprises a heating element which is made of zirconia and which has a fiber receiving slit for containing said optical fibers, said fiber receiving slit formed across the entire length of said heating element, and wherein said fiber receiving slit extends from the periphery of said heating element to the center of said heating element, said center disposed between the bottom of said fiber receiving slit and said periphery of said heating element.

5. The optical fiber coupler making apparatus according to claim 4, further comprising moving means for disposing said heater such that said optical fibers are contained in said fiber receiving slit of said heating element.

6. The optical fiber coupler making apparatus according to claim 4, further comprising a gas supply mechanism for supplying a clean gas to surroundings of said heater.

7. The optical fiber coupler making apparatus according to claim 6, wherein said gas supply mechanism comprises a box for enclosing the vicinity of said heater, a gas supply source for feeding a clean gas into said box and;

a pipe for connecting said box and said gas supply source.

8. The optical fiber coupler making apparatus according to claim 4, wherein said fiber receiving slit is formed continuously across the entire length of said heating element.

9. The optical fiber coupler making apparatus according to claim 4, wherein said heater further comprises a heat insulating member within which said heating element is contained.

10. The optical fiber coupler making apparatus according to claim 4, wherein heater further comprises two heat insulating members.

11. An optical fiber coupler making apparatus which makes an optical fiber coupler by thermally fusing a plurality of optical fibers together by use of a heater and then elongating thus thermally fused part, wherein said heater comprises a heating element which is made of zirconia and which has a fiber receiving slit for containing said optical fibers, said fiber receiving slit formed across the entire length of said heating element, the optical fiber coupler making apparatus further comprising: moving means for disposing said heater such that said optical fibers are contained in said fiber receiving slit of said heating element; a pair of elongating stages; and clamps for securing said optical fibers to said elongating stages, said clamps being provided on each of said elongating stages respectively.

* * * * *